United States Patent
Fu (10) Patent No.: US 10,956,847 B2
(45) Date of Patent: Mar. 23, 2021

(54) RISK IDENTIFICATION BASED ON HISTORICAL BEHAVIORAL DATA

(71) Applicant: Advanced New Technologies Co., Ltd., George Town (KY)

(72) Inventor: Yang Fu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 210 days.

(21) Appl. No.: 15/809,799

(22) Filed: Nov. 10, 2017

(65) Prior Publication Data

US 2018/0082229 A1 Mar. 22, 2018

Related U.S. Application Data

(63) Continuation of application No. PCT/CN2016/081089, filed on May 5, 2016.

(30) Foreign Application Priority Data

May 13, 2015 (CN) .......................... 201510244028.4

(51) Int. Cl.
*G06Q 10/06* (2012.01)
*G06Q 20/40* (2012.01)
*G06Q 30/02* (2012.01)

(52) U.S. Cl.
CPC ..... *G06Q 10/0635* (2013.01); *G06Q 20/4016* (2013.01); *G06Q 30/02* (2013.01); *G06Q 20/40* (2013.01)

(58) Field of Classification Search
None
See application file for complete search history.

(56) References Cited

U.S. PATENT DOCUMENTS

2008/0140576 A1 6/2008 Lewis et al.
2009/0307049 A1* 12/2009 Elliott, Jr. .......... G06Q 30/0201
705/7.29
(Continued)

FOREIGN PATENT DOCUMENTS

CN 103793484 5/2014
CN 103853841 6/2014
(Continued)

OTHER PUBLICATIONS

Detecting Deceptive Chat-Based Communications Using Typing Behavior and message Cues; Derrick et. al.; 2013 (Year: 2013).*
(Continued)

*Primary Examiner* — Deirdre D Hatcher
(74) *Attorney, Agent, or Firm* — Fish & Richardson P.C.

(57) ABSTRACT

A user's historical service data of a first time period and a second time period is obtained. Means and variances of a plurality of users' historical service data of the first time period and the second period are calculated. A risk model is generated based on at least one type of the plurality of users' historical behavioral data. The user's service data is obtained. At least one type of the user's behavior data is introduced to the risk model. A determination is made whether the at least one type of the user's behavior data is outside of the safety threshold. A service corresponding to the service data is rejected when the at least one type of the user's behavior data is outside of the safety threshold.

20 Claims, 3 Drawing Sheets

(56) References Cited

U.S. PATENT DOCUMENTS

| | | | |
|---|---|---|---|
| 2010/0094767 A1 | 4/2010 | Miltonberger | |
| 2010/0145836 A1 | 6/2010 | Baker et al. | |
| 2010/0161399 A1* | 6/2010 | Posner | G06Q 30/02 |
| | | | 705/14.13 |
| 2011/0055074 A1* | 3/2011 | Chen | G06Q 20/10 |
| | | | 705/39 |
| 2011/0307381 A1* | 12/2011 | Kim | G06Q 20/027 |
| | | | 705/44 |
| 2012/0109821 A1 | 5/2012 | Barbour et al. | |
| 2012/0297484 A1* | 11/2012 | Srivastava | G06F 21/552 |
| | | | 726/23 |
| 2013/0054433 A1 | 2/2013 | Giard et al. | |
| 2013/0144888 A1 | 6/2013 | Faith et al. | |
| 2014/0201120 A1 | 7/2014 | Lydon et al. | |
| 2015/0032589 A1 | 1/2015 | Adjaoute | |
| 2015/0066772 A1 | 3/2015 | Griffin et al. | |

FOREIGN PATENT DOCUMENTS

| | | |
|---|---|---|
| CN | 103875015 | 6/2014 |
| CN | 104318138 | 1/2015 |
| CN | 104469805 | 1/2015 |
| EP | 1816595 | 8/2007 |
| JP | H11338924 | 12/1999 |
| JP | 2008158683 | 7/2008 |
| JP | 2010044639 | 2/2010 |
| JP | 2011059837 | 3/2011 |
| JP | 2014008232 | 1/2014 |
| JP | 2014106910 | 6/2014 |
| WO | 2007090605 | 8/2007 |
| WO | 2016093945 | 6/2016 |

OTHER PUBLICATIONS

Yu, "Application Decision Tree to Construct Personal Housing Loan Risk Assessment Model," China Master's Theses Full-text Database, Dec. 2007, 63 pages (Abstract Only).
Extended European Search Report issued in EP Application No. 16792117.0 dated Sep. 10, 2018; 10 pages.
International Search Report of the International Searching Authority issued in International Application No. PCT/CN2016/081089 dated Aug. 16, 2016; 9 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/081089, dated Nov. 14, 2017, 10 pages (with English translation).
Search Report and Written Opinion of the Intellectual Property Office of Singapore issued in Singapore Application No. 11201709271S dated Jun. 19, 2018; 11 pages.

* cited by examiner

RISK IDENTIFICATION BASED ON HISTORICAL BEHAVIORAL DATA

This application is a continuation of PCT Application No. PCT/CN2016/081089 filed on May 5, 2016, which claims priority to Chinese Patent Application No. 201510244028.4, filed on May 13, 2015, and each application is incorporated by reference in its entirety.

TECHNICAL FIELD

This disclosure relates to risk identification, and more particularly to transactional risk analysis based on historical user behavioral data.

BACKGROUND

Identity theft is one of the most significant issues in cybersecurity, especially for online transactions involving payment and fund transfer. Anti-identity theft systems normally identify identity theft based on information used to perform the transaction and associated with the user's computing device, geographic location, or IP address. If abnormal behavior is found, the system may determine that the transaction is performed by an unauthorized user. When the information is unavailable, or an authorized user changes user computing devices or geographic location, the system may falsely indicate that an identity theft has occurred or require additional user identity authentication. The additional user identity authentication can be time consuming and compromise user experience.

SUMMARY

The present disclosure describes risk identification based on historical user behavior data.

In an implementation, at least one type of a plurality of users' historical behavior data of a first time period is obtained. At least one of a first mean or a first variance of the at least one type of the plurality of users' historical behavior data of the first time period are calculated. At least one type of the plurality of users' historical behavior data of a second time period is obtained. At least one of a second mean or a second variance of the at least one type of the plurality of users' historical behavior data of the second time period is calculated. A risk model based on at least one of the historical behavior data of the first time period or the historical behavior data of the second time period is generated. A user's service data, including at least one type of the user's behavior data is obtained. The at least one type of the user's behavior data is introduced to the risk model, and a a service corresponding to the service data based on the risk model is rejected.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to improve data exchange security and user experience during identity authentication. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes risk identification based on historical service data, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Identity theft is one of the most significant issues in cybersecurity, especially for online transactions involving payment and fund transfer. Anti-identity theft systems normally identify identity theft based on information used to perform the transaction and associated with the user's computing device, geographic location, or IP address. If abnormal behavior is found, the system may determine that the transaction is performed by an unauthorized user. When the information is unavailable, or an authorized user changes user computing devices or geographic location, the system may falsely indicate that an identity theft has occurred or require additional user identity authentication. The additional user identity authentication can be time consuming and compromise user experience.

The present disclosure describes identity theft risk identification technology based on historical service data. The service data can be any data associated with network-based services such as online transaction, payment, gaming, or streaming. For example, a user may initiate a real-time transaction which may generate and transmit transaction data. The transaction data can be generated by user input or collected by a user computing device. After the transaction data is generated, it can be transmitted to a transaction server. The transaction server may determine, based on the transaction data, the identity of the user who initiated the transaction to ensure that the authorized user's data is safe from identity theft.

The service data can explicitly or implicitly include one or more types of a user's behavior data. The determination of the user's identity can be made by using a risk model based on at least one type of the user's historical behavioral data associated with a service performed by the user. The user's behavior data can be any data associated with the user's interaction with a third party or a service system for performing the service.

Figure 1:
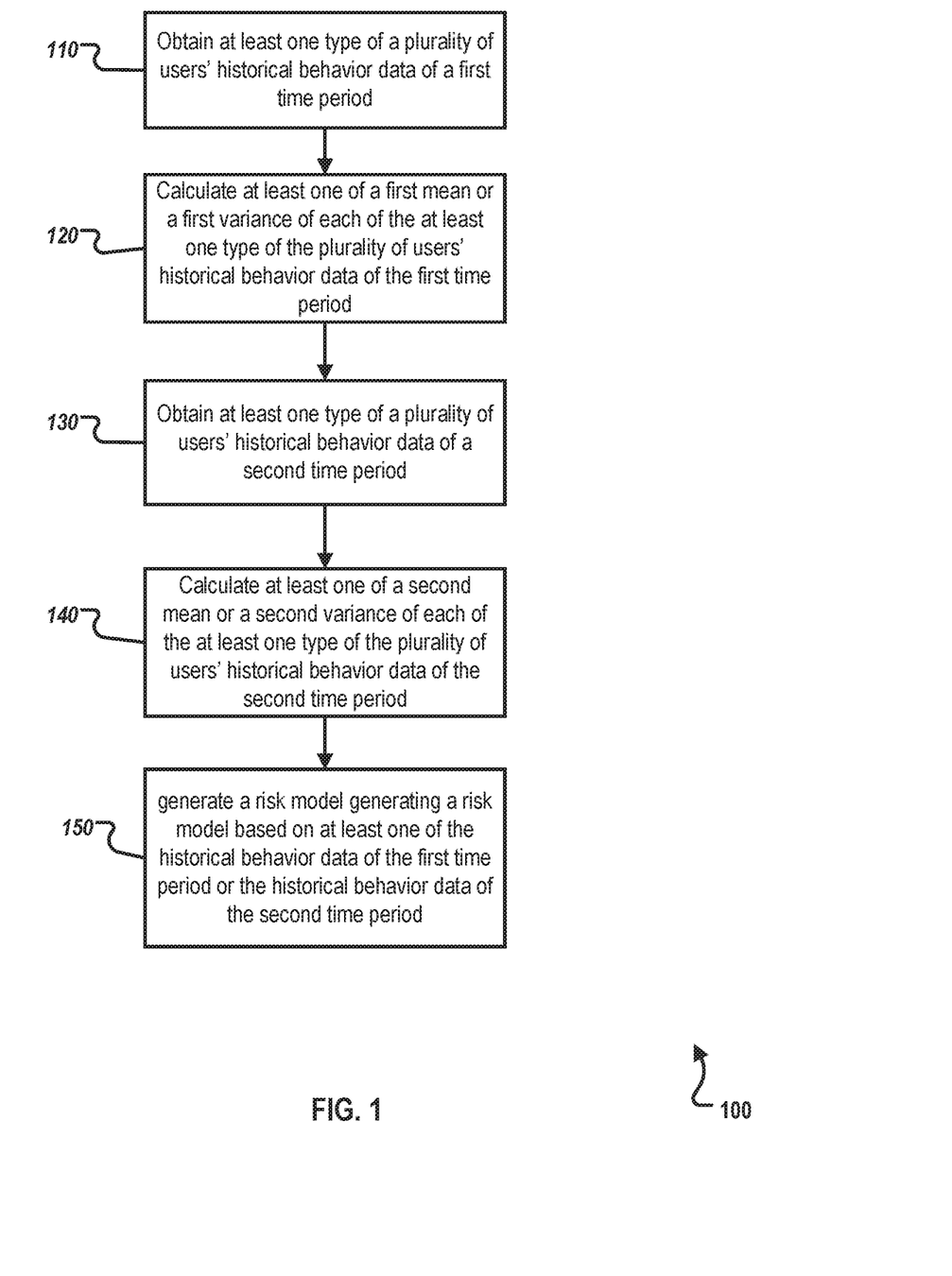
FIG. 1 is a flow chart illustrating an example of a method for constructing a risk model for risk identification based on historical service data, according to an implementation of the present disclosure.

FIG. 1 is a flow chart illustrating an example of a method 100 of constructing a risk model for risk identification based on historical service data, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some cases, various steps of method 100 can be run in parallel, in combination, in loops, or in any order.

At 110, at least one type of a plurality of users' historical behavioral data of a first time period is obtained. A user's historical behavioral data can be any data associated with the user's interactions with a third party or a service system for performing the service of a historical time period. The user's historical behavioral data can be obtained based on the user's service data. The user's service data can be any data associated with the user's user identification (ID) for network-based services such as data generated through online transaction, payment, gaming, or streaming. The plurality of users can be the users that used the service provided by the service system. At least one type of historical behavior data of the plurality of users are recorded by the service system.

The first time period can be a time period in the recent past. For example, a time period starting from the inception of the service to date or it can be a period of sufficient length (for example, a year) that enough historical behavior data can be collected for the user to form a risk model. In some cases, the user's behavioral data of the first time period includes authorized interactions with the third party or the service system. Data associated with interactions from unauthorized or illegal use of the user's account is not included in the user's historical behavioral data of the first time period.

A user's historical behavior data can include different data types, such as the time duration of a communication between the user and the third party, the amount of data exchanged through the communication between the user and the third party, and a time between the end of the communication to a time of a corresponding action (for example, making payment).

The user's historical data can be obtained in a variety of ways based on the user's ID. Using online shopping as an example, user historical behavior data can be obtained from instant messaging (IM) between a user and a merchant. In this example, the types of user historical behavior data that can be obtained can include IM durations between the user and the seller or merchant, amount of data exchanged through the IM, and the time from the end of the IM to the start of a payment. The user's ID can be used to retrieve IM records with the seller on all or a specific online shopping platform within a previous time period, such as a year.

The content of the IM between a user and a merchant for online shopping can often include details of the items on sale, the availability of an item, or the shipping cost and method. Different users can have different behaviors in terms of IM durations, data amount exchanged through the IM, and the times from the end of the IM to the start of the payment. A user's identity can be identified based on the authorized user's historical behavior data to ensure the safety of the user's account during online shopping. From 110, method 100 proceeds to 120.

At 120, at least one of a first mean or a first variance of each of the at least one type of the plurality of users' historical behavior data of the first time period is calculated. In some cases, risk models can be constructed for users with historical service data, which satisfy certain conditions. For example, one condition can be that the number of the user's transactions is greater than a predetermined threshold, such that the service data size is large enough to be statistically significant for constructing the risk model. For each user selected to contrast the risk model, a mean or variance can be calculated for at least one type of the user's historical behavior data. In some cases, one or more types of a user's historical behavior data can be used to from a sample to construct the risk model. In some cases, one or more types of a user's historical behavior data can be used to from a sample to construct the risk model. In the aforementioned online shopping example, a mean or variance can be calculated for each type of the user's historical behavior data including IM durations between the user and the seller, amount of data exchanged through the IM, and the time from the end of the IM to the start of the payment in the past year. From 120, method 100 proceeds to 130.

At 130, at least one type of the plurality of users' historical behavior data of a second time period is obtained. The second time period can be a time period shorter than the first time period, such as a month. In some cases, the second time period can be a most recent time period of the first period. For example, if the first time period is the past year, the second time period can be the past month of the past year. In some cases, the second time period can be a more recent but different time period from the first time period. For example, the second time period can be the past month and the first time period can be the year before the past month.

In some cases, the user's historical behavior data of the second time period can include all user account interactions with a third party or the service system of the second time period. Data associated with interactions from authorized and unauthorized can be included in the user's historical behavior data of the second time period. In the aforementioned online shopping example, the user's historical behavior data of the second time period can be obtained from IM records between the user and the seller of the second time period. From 130, method 100 proceeds to 140.

At 140, at least one of a second mean or a second variance of each of the at least one type of the plurality of users' historical behavior data of the second time period is calculated. In the aforementioned online shopping example, a mean or a variance can be calculated for each type of the user's historical behavioral data including IM durations, amount of data exchanged through the IM, and the time from the end of the IM to the start of the payment during the second time period. Based on different implementation scenarios, steps 130 and 140 can be performed before, after, or at substantially the same time as the steps 110 and 120. From 140, method 100 proceeds to 150.

At 150, a risk model is generated based on at least one of the historical behavior data of the first time period or the historical behavior data of the second time period. In some implementations, the risk model can be generated based on a decision tree, wherein the decision tree is constructed based on at least one safety threshold determined based on at least one of the historical behavior data of the first time period or the historical behavior data of the second period. It can be understood that the risk model can also be generated based on other decision algorithms such as neural network based on algorithms including cellular neural networks and deep neural networks.

In some cases, the decision tree can include safety threshold for decision making determined based on at least one of the first mean, the second mean, the first variance, the second variance, difference between the first mean and the second mean, or difference between the first variance and the second variance of the corresponding at least one type of the user's historical behavior data.

Using the aforementioned online shopping example, a decision tree can include safety thresholds determined based on the IM duration, amount of data exchanged through the IM, and the time from the end of the IM to the start of the payment. For example, assume that the first time duration is the past year, and the second time duration is the past month, at a first decision node, the decision tree decides whether the user's current IM duration with the seller is greater than 10% of the mean IM durations of the past year, where 10% of the mean IM duration can be a first safety threshold. If yes, the decision tree decides at a second node whether the difference between the user's IM data amount and the mean of the IM data amount is less than 150% of the variance of the IM data amount of the past month. Similarly, 150% of the variance of the IM data amount of the past month can be a second safety threshold. If yes, the decide tree can decide at a third decision node whether the time from the end of the IM to the start of the payment is less than 200% of the mean of the times from the end of the IM to the start of the payment of the second time period.

In some cases, the at least one safety threshold can be determined based on the difference between the means of the historical behavior data of the first time period and the historical behavior data of the second time period, or the difference between the variances of the historical behavior data of the first time period and the historical behavior data of the second time period. Using the aforementioned online shopping example, if the mean of the IM durations of the past year is 120 seconds and the IM durations of the past month is 60 seconds. It can suggest that the buyer's communication with the seller is more efficient. As such, the safety threshold for making a decision corresponding to IM duration data can be loosened. For example, if the mean difference of the IM durations between the past year and past month is 60 seconds, the current IM duration can pass the corresponding decision node if it is greater than a 20 seconds safety threshold. If the mean difference of the IM durations between the past year and past month is 90 seconds, the current IM duration can pass the corresponding decision node if it is greater than a 10 seconds safety threshold.

In some cases, the risk models can be automatically updated based on additional user service data. For example, when a user performs a new transaction through online shopping, the transaction service data can be used to update the risk model for the user. In some cases, the risk model can be updated periodically (for example, once every 24 hours) to reduce the computational burden on the service system or server. After 150, method 100 ends.

Figure 2:
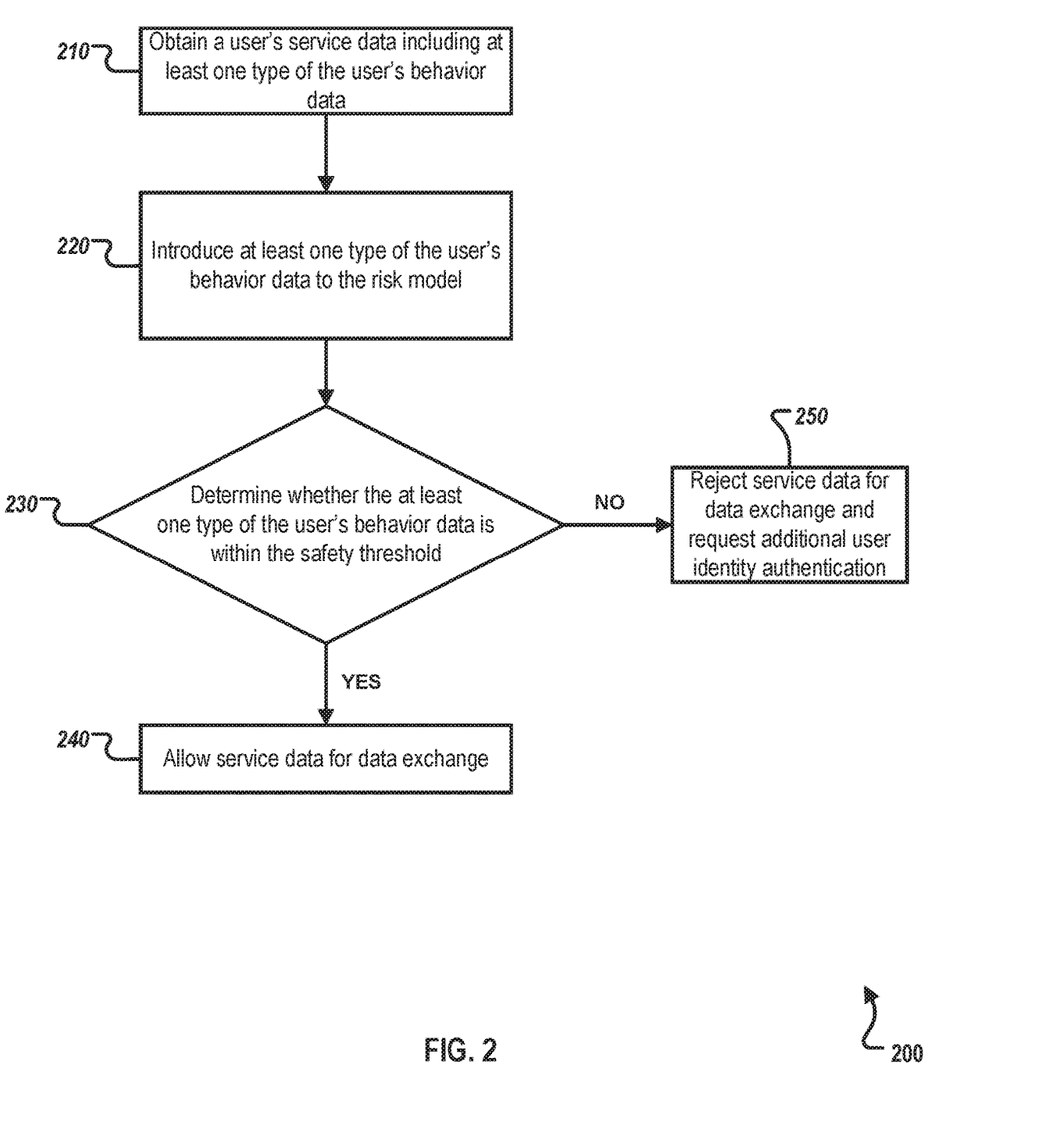
FIG. 2 is a flow chart illustrating an example of a method for identifying risk of identity theft based a user's service data using a risk model, according to an implementation of the present disclosure.

FIG. 2 is a flow chart illustrating an example of a method 200 for identifying risk of identity theft based a user's service data using a risk model, according to an implementation of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some cases, various steps of method 200 can be run in parallel, in combination, in loops, or in any order.

At 210, service data for a user, including at least one type of the user's behavior data, is obtained. The service data can be any data associated with a service currently performed by the user, such as an online transaction, payment, gaming, or streaming. For example, the current service can be a transaction service. A user can initiate a real-time transaction which may generate and transmit transaction data. The transaction data can be generated by user input or collected by a user computing device. After the transaction data is generated, the transaction data can be sent to a transaction server. The transaction server can determine, based on the transaction data, the identity of the user who initiated the transaction to ensure that the authorized user's data is safe from identity theft. From 210, method 100 proceeds to 220.

At 220, at least one type of the user's behavior data is introduced to a risk model based on the decision tree. In some cases, a user's service data may not contain certain types of the user's behavior data. For example, a user may never interact with a particular third party to perform the service. In such cases, the risk model may not be built due to the lack of historical service data. The user's identity theft risk can instead be determined based on information associated with the user's user computing device, geographic location, or IP address used to perform the service. From 220, method 200 proceeds to 230.

At 230, whether the at least one type of the user's behavior data is within a corresponding safety threshold, is determined. If yes, method 200 proceeds to 240. Otherwise, method 200 proceeds to 250. Using online shopping as an example, user behavior data can be obtained from instant messaging (IM) between a user and a merchant. The types of user behavior data that can be obtained include IM durations between the user and the seller or merchant, data amount exchanged through the IM, and the times from the end of the IM to the start of the payment.

A risk model for the user can be retrieved based on the user's ID. The risk model can include at least one safety threshold associated with the at least one type of user behavior data. The construction of the user's risk model can be based on the implementations discussed in the description of FIG. 1.

The user's behavior data for performing the current service can be introduced to the risk model for user identity verification. For example, a safety threshold for the times from the end of the IM to the start of the payment based on the user's risk model can be between 1 second to 5 minutes. In the current service, if the user has not started payment for over 5 minutes from the end of IM, the service system or server can reject the user's access to payment and require additional user identity verification, such as reentering password.

At 240, service data for data exchange is allowed. In some cases, the user can be allowed for data exchange when at least one type of the user's behavior data is within the corresponding safety threshold. In some cases, the user can be allowed for data exchange when the user's behavior data are within all the corresponding safety thresholds provided in the user's risk model. After 240, method 200 stops.

At 250, service data for data exchange is rejected and additional user identity authentication is requested. Additional user identity authentication can be performed by reentering a user account password, answer security questions, or any other additional security authentications. In some cases, the user can be rejected service without providing additional user identity authentication options. After 250, method 200 stops.

Figure 3:
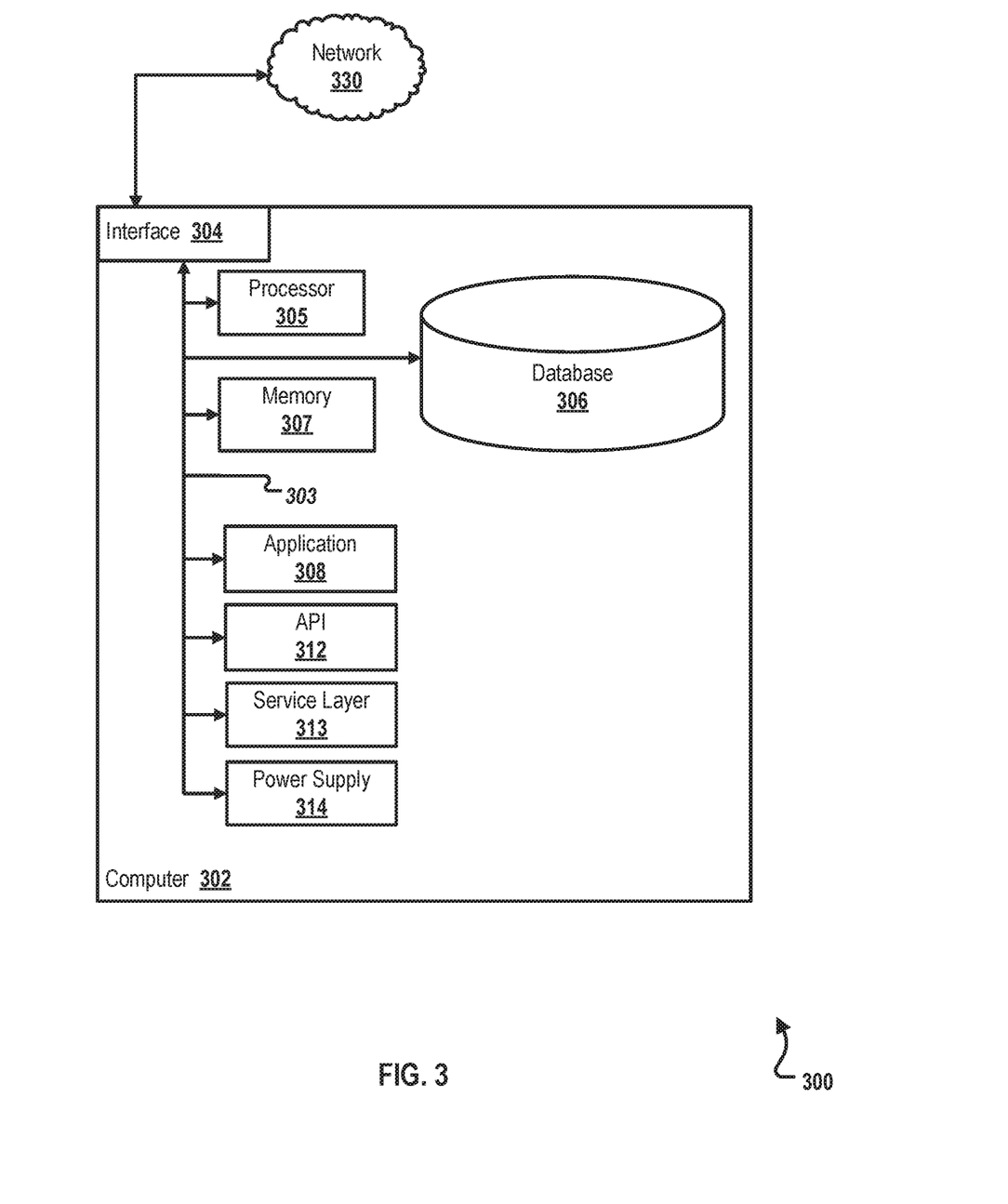
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented system 300 used to provide computational functionalities associated with described algorithms, methods, functions, processes, flows, and procedures, according to an implementation of the present disclosure. In the illustrated implementation, system 300 includes a computer 302 and a network 330.

The illustrated computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 302 can include an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a distributed computing system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

At a high level, the computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users (for example, from a command console or by another internal access method), external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and includes logic encoded in software, hardware, or a combination of software and hardware. More specifically, the interface 304 can include software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory, conventional, or another type of database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

Described implementations of the subject matter can include one or more features, alone or in combination.

For example, in a first implementation, a computer-implemented method, comprising: obtaining at least one type of a plurality of users' historical behavior data of a first time period; calculating at least one of a first mean or a first variance of the at least one type of the plurality of users' historical behavior data of the first time period; obtaining at least one type of the plurality of users' historical behavior data of a second time period; calculating at least one of a second mean or a second variance of the at least one type of the plurality of users' historical behavior data of the second time period; generating a risk model based on at least one of the historical behavior data of the first time period or the historical behavior data of the second time period; obtaining a user's service data, including at least one type of the user's behavior data; introducing the at least one type of the user's behavior data to the risk model; and rejecting a service corresponding to the service data based on the risk model.

The foregoing and other described implementations can each, optionally, include one or more of the following features:

A first feature, combinable with any of the following features, the service data includes instant messaging data between the user and a third-party, and the service is a transaction service.

A second feature, combinable with any of the previous or following features, wherein the at least one type of the plurality of users' historical behavioral data is at least one of an instant messaging duration between the user and a third party, data amount exchanged through the instant messaging between the user and the third party, and a time from the end of the instant messaging to the start of the transaction service.

A third feature, combinable with any of the previous or following features, wherein the at least one type of the plurality of users' historical behavioral data of the first time period and the at least one type of the plurality of users' historical behavioral data of the second time period are determined based on the user's identification number.

A fourth feature, combinable with any of the previous or following features, wherein the at least one type of the plurality of users' historical behavioral data is associated with the user's interactions with a third party for performing the service.

A fifth feature, combinable with any of the previous or following features, wherein the second time period is a time period within the first time period.

A sixth feature, combinable with any of the previous or following features, wherein the second time period is a time period more recent than the first time period.

A seventh feature, combinable with any of the previous or following features, wherein the risk model is based on a decision tree or a neural network based on at least one safety threshold.

An eighth feature, combinable with any of the previous or following features, further comprising: determining whether the at least one type of the plurality of users' historical behavioral data is outside of the corresponding at least one safety threshold; and rejecting a service corresponding to the service data when the at least one type of the user's behavior data is outside of the safety threshold.

In a second implementation, a non-transitory, computer-readable medium storing one or more instructions executable by a computer system to perform operations comprising: obtaining at least one type of a plurality of users' historical behavior data of a first time period; calculating at least one of a first mean or a first variance of the at least one type of the plurality of users' historical behavior data of the first time period; obtaining at least one type of the plurality of users' historical behavior data of a second time period; calculating at least one of a second mean or a second variance of the at least one type of the plurality of users' historical behavior data of the second time period; generating a risk model based on at least one of the historical behavior data of the first time period or the historical behavior data of the second time period; obtaining a user's service data, including at least one type of the user's behavior data; introducing the at least one type of the user's behavior data to the risk model; and rejecting a service corresponding to the service data based on the risk model.

The foregoing and other described implementations can each, optionally, include one or more of the following features:

A first feature, combinable with any of the following features, the service data includes instant messaging data between the user and a third-party, and the service is a transaction service.

A second feature, combinable with any of the previous or following features, wherein the at least one type of the plurality of users' historical behavioral data is at least one of an instant messaging duration between the user and a third party, data amount exchanged through the instant messaging between the user and the third party, and a time from the end of the instant messaging to the start of the transaction service.

A third feature, combinable with any of the previous or following features, wherein the at least one type of the plurality of users' historical behavioral data of the first time period and the at least one type of the plurality of users' historical behavioral data of the second time period are determined based on the user's identification number.

A fourth feature, combinable with any of the previous or following features, wherein the at least one type of the plurality of users' historical behavioral data is associated with the user's interactions with a third party for performing the service.

A fifth feature, combinable with any of the previous or following features, wherein the second time period is a time period within the first time period.

A sixth feature, combinable with any of the previous or following features, wherein the second time period is a time period more recent than the first time period.

A seventh feature, combinable with any of the previous or following features, wherein the risk model is based on a decision tree or a neural network based on at least one safety threshold.

An eighth feature, combinable with any of the previous or following features, further comprising: determining whether the at least one type of the plurality of users' historical behavioral data is outside of the corresponding at least one safety threshold; and rejecting a service corresponding to the service data when the at least one type of the user's behavior data is outside of the safety threshold.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: obtaining at least one type of a plurality of users' historical behavior data of a first time period; calculating at least one of a first mean or a first variance of the at least one type of the plurality of users' historical behavior data of the first time period; obtaining at least one type of the plurality of users' historical behavior data of a second time period; calculating at least one of a second mean or a second variance of the at least one type of the plurality of users' historical behavior data of the second time period; generating a risk model based on at least one of the historical behavior data of the first time period or the historical behavior data of the second time period; obtaining a user's service data, including at least one type of the user's behavior data; introducing the at least one type of the user's behavior data to the risk model; and rejecting a service corresponding to the service data based on the risk model.

The foregoing and other described implementations can each, optionally, include one or more of the following features:

A first feature, combinable with any of the following features, the service data includes instant messaging data between the user and a third-party, and the service is a transaction service.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    obtaining, by a computer system of an online service site accessible to a plurality of users, a first type of the plurality of users' historical behavior data of a first time period in which the users interacted with the online service site, wherein the first type of the plurality of users' historical behavior data represents respective time durations between when a user sends an instant message and when the user provides a request for a service of the online service site;
    calculating, by the computer system of the online service site for each user of the plurality of users, a first metric value for the first type of the plurality of users' historical behavior data over the first time period;
    obtaining, by the computer system of the online service site, a second type of the plurality of users' historical behavior data of a second time period that is shorter than the first time period;
    calculating, by the computer system of the online service site for each user of the plurality of users, a second metric value for the second type of the plurality of users' historical behavior data over the second time period that is shorter than the first time period;
    generating a respective user-specific risk model for each user of the plurality of users who accessed the online service site over the first time period, wherein each respective risk model for each user is based on first historical behavior data of the first type by the user over the first time period and second historical behavior data of the second type of the user over the second time period, wherein generating the user-specific risk model comprises generating a user-specific safety threshold based on historical behavior data of the first type over the first time period that represents a time duration within which the user must initiate the request for the service after sending the online service site the instant message in order for the request for the service to be approved;
    receiving, from a particular user of the plurality of users, a request for the service provided by the online service site;
    computing a first value for the first type of behavior data by the particular user, including computing a time duration between which the particular user sent the online service site an instant message and when the user provided a request for the service;
    computing a second value for the second type of the behavior data by the particular user;

obtaining, by the computer system of the online service site, a user-specific risk model for the particular user, wherein the user-specific risk model for the particular user comprises the user-specific safety threshold computed for the particular user from the first type of the particular user's historical behavior data;

determining, based on the first value for the first type of the behavior data by the particular user, that the particular user did not initiate the request for the service within the time duration specified by the user-specific safety threshold generated for the particular user; and in response to determining that the particular user did not initiate the request for the service within the time duration specified by the user-specific safety threshold generated for the particular user, rejecting the request for the service.

2. The computer-implemented method of claim 1, wherein the first type of the behavior data by the particular user includes instant messaging data between the particular user and a third-party, and the service is a transaction service.

3. The computer-implemented method of claim 2, wherein the first type of the plurality of users' historical behavior data is at least one of an instant messaging duration between each user and a third party, amount of data exchanged through instant messaging between each user and the third party, and a time from an end of the instant messaging to a start of the transaction service.

4. The computer-implemented method of claim 1, wherein the first type of the plurality of users' historical behavior data of the first time period and the second type of the plurality of users' historical behavior data of the second time period are determined based on the users' identification numbers.

5. The computer-implemented method of claim 1, wherein the first type of the plurality of users' historical behavior data is associated with the users' interactions with a third party for performing the service.

6. The computer-implemented method of claim 1, where in the second time period is a time period within the first time period.

7. The computer-implemented method of claim 1, where in the second time period is a time period more recent than the first time period.

8. The computer-implemented method of claim 1, wherein the user-specific risk model is based on a decision tree or a neural network based on the user-specific safety threshold.

9. A non-transitory, computer-readable medium storing one or more instructions executable by a computer system to perform operations comprising:

obtaining, by the computer system of an online service site accessible to a plurality of users, a first type of the plurality of users' historical behavior data of a first time period in which the users interacted with the online service site, wherein the first type of the plurality of users' historical behavior data represents respective time durations between when a user sends an instant message and when the user provides a request for a service of the online service site;

calculating, by the computer system of the online service site for each user of the plurality of users, a first metric value for the first type of the plurality of users' historical behavior data over the first time period;

obtaining, by the computer system of the online service site, a second type of the plurality of users' historical behavior data of a second time period that is shorter than the first time period;

calculating, by the computer system of the online service site for each user of the plurality of users, a second metric value for the second type of the plurality of users' historical behavior data over the second time period that is shorter than the first time period;

generating a respective user-specific risk model for each user of the plurality of users who accessed the online service site over the first time period, wherein each respective risk model for each user is based on first historical behavior data of the first type by the user over the first time period and second historical behavior data of the second type of the user over the second time period, wherein generating the user-specific risk model comprises generating a user-specific safety threshold based on historical behavior data of the first type over the first time period that represents a time duration within which the user must initiate the request for the service after sending the online service site the instant message in order for the request for the service to be approved;

receiving, from a particular user of the plurality of users, a request for the service provided by the online service site;

computing a first value for the first type of behavior data by the particular user, including computing a time duration between which the particular user sent the online service site an instant message and when the user provided a request for the service;

computing a second value for the second type of the behavior data by the particular user;

obtaining, by the computer system of the online service site, a user-specific risk model for the particular user, wherein the user-specific risk model for the particular user comprises the user-specific safety threshold computed for the particular user from the first type of the particular user's historical behavior data;

determining, based on the first value for the first type of the behavior data by the particular user, that the particular user did not initiate the request for the service within the time duration specified by the user-specific safety threshold generated for the particular user; and in response to determining that the particular user did not initiate the request for the service within the time duration specified by the user-specific safety threshold generated for the particular user, rejecting the request for the service.

10. The non-transitory, computer-readable medium of claim 9, wherein the first type of the behavior data by the particular user includes instant messaging data between the particular user and a third-party, and the service is a transaction service.

11. The non-transitory, computer-readable medium of claim 10, wherein the first type of the plurality of users' historical behavior data is at least one of an instant messaging duration between each user and a third party, amount of data exchanged through instant messaging between each user and the third party, and a time from an end of the instant messaging to a start of the transaction service.

12. The non-transitory, computer-readable medium of claim 11, wherein the first type of the plurality of users' historical behavior data of the first time period and the second type of the plurality of users' historical behavior data of the second time period are determined based on the users' identification numbers.

13. The non-transitory, computer-readable medium of claim 9, wherein the first type of the plurality of users' historical behavior data is associated with the users' interactions with a third party for performing the service.

14. The non-transitory, computer-readable medium of claim 9, where in the second time period is a time period within the first time period.

15. The non-transitory, computer-readable medium of claim 9, where in the second time period is a time period more recent than the first time period.

16. The non-transitory, computer-readable medium of claim 9, wherein the user-specific risk model is based on a decision tree or a neural network based on the user-specific safety threshold.

17. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
obtaining, by the computer-implemented system of an online service site accessible to a plurality of users, a first type of the plurality of users' historical behavior data of a first time period in which the users interacted with the online service site, wherein the first type of the plurality of users' historical behavior data represents respective time durations between when a user sends an instant message and when the user provides a request for a service of the online service site;
calculating, by the computer-implemented system of the online service site for each user of the plurality of users, a first metric value for the first type of the plurality of users' historical behavior data over the first time period;
obtaining, by the computer-implemented system of the online service site, a second type of the plurality of users' historical behavior data of a second time period that is shorter than the first time period;
calculating, by the computer-implemented system of the online service site for each user of the plurality of users, a second metric value for the second type of the plurality of users' historical behavior data over the second time period that is shorter than the first time period;
generating a respective user-specific risk model for each user of the plurality of users who accessed the online service site over the first time period, wherein each respective risk model for each user is based on first historical behavior data of the first type by the user over the first time period and second historical behavior data of the second type of the user over the second time period, wherein generating the user-specific risk model comprises generating a user-specific safety threshold based on historical behavior data of the first type over the first time period that represents a time duration within which the user must initiate the request for the service after sending the online service site the instant message in order for the request for the service to be approved;
receiving, from a particular user of the plurality of users, a request for the service provided by the online service site;
computing a first value for the first type of behavior data by the particular user, including computing a time duration between which the particular user sent the online service site an instant message and when the user provided a request for the service;
computing a second value for the second type of the behavior data by the particular user;
obtaining, by the computer-implemented system of the online service site, a user-specific risk model for the particular user, wherein the user-specific risk model for the particular user comprises the user-specific safety threshold computed for the particular user from the first type of the particular user's historical behavior data;
determining, based on the first value for the first type of the behavior data by the particular user, that the particular user did not initiate the request for the service within the time duration specified by the user-specific safety threshold generated for the particular user; and
in response to determining that the particular user did not initiate the request for the service within the time duration specified by the user-specific safety threshold generated for the particular user, rejecting the request for the service.

18. The computer-implemented system of claim 17, wherein the first type of the behavior data by the particular user includes instant messaging data between the particular user and a third-party, and the service is a transaction service.

19. The computer-implemented method of claim 1, wherein the time duration is a time duration starting after the particular user sends a last instant message to a seller and ending at or before the particular user provides a request for a transaction service to pay the seller.

20. The computer-implemented method of claim 1, wherein the user-specific risk model for the particular user comprises the user-specific safety threshold computed for the particular user from the first type of the particular user's historical behavior data and the second type of the particular user's historical behavior data, and further comprising:
determining, based on first value for the first type of behavior data and the second value for the second type of the behavior data by the particular user, that the particular user did not initiate the request for the service within the time duration specified by the user-specific safety threshold generated for the particular user.

* * * * *